United States Patent
Lee (10) Patent No.: US 9,937,805 B2
(45) Date of Patent: Apr. 10, 2018

(54) BATTERY CHARGING SYSTEM AND CHARGING METHOD USING SAME

(71) Applicant: LG CHEM, LTD., Seoul (KR)

(72) Inventor: Sun Jong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 989 days.

(21) Appl. No.: 13/910,223

(22) Filed: Jun. 5, 2013

(65) Prior Publication Data

US 2013/0264995 A1    Oct. 10, 2013

Related U.S. Application Data

(63) Continuation of application No. PCT/KR2012/007597, filed on Sep. 21, 2012.

(30) Foreign Application Priority Data

Sep. 23, 2011  (KR) .................... 10-2011-0096404

(51) Int. Cl.
*B60L 11/18* (2006.01)
*B60L 1/00* (2006.01)
(Continued)

(52) U.S. Cl.
CPC .......... *B60L 11/1816* (2013.01); *B60L 11/14* (2013.01); *B60L 11/1803* (2013.01);
(Continued)

(58) Field of Classification Search
CPC ... H02J 7/00; H02J 7/0054; H02J 7/14; B60L 11/1808; B60L 11/1816; B60L 11/1838
(Continued)

(56) References Cited

U.S. PATENT DOCUMENTS 4,527,111 A * 7/1985 Branham ............... H01M 10/44
320/105
4,769,586 A * 9/1988 Kazmierowicz ...... H02J 7/0034
307/10.1
(Continued)

FOREIGN PATENT DOCUMENTS

CN        101330225 A     12/2008
DE  10 2009 029 091 A1    3/2011
(Continued)

OTHER PUBLICATIONS

China Office Action for Appl. No. 201280004389.6 dated Dec. 2, 2014 (w/ English translation).
(Continued)

*Primary Examiner* — Samuel Berhanu
*Assistant Examiner* — Tarikh Rankine
(74) *Attorney, Agent, or Firm* — Birch, Stewart, Kolasch & Birch, LLP (57) ABSTRACT

Disclosed are a battery charging system and method. The battery charging system according to the present invention includes a first connector connected to both ends of a battery of a charging providing car; a second connector connected to both ends of a battery of a charging target car; a converter configured to convert a voltage transmitted from the battery of the charging providing car through the first connector and transmit the converted voltage to the battery of the charging target car through the second connector; and a controller connected to each of a battery management system (BMS) of the charging providing car and a BMS of the charging target car to control a voltage conversion ratio of the converter based on a state information on each of the batteries transmitted from each of the BMSs.

20 Claims, 6 Drawing Sheets

(51) Int. Cl.
  *B60L 3/00* (2006.01)
  *H02J 7/00* (2006.01)
  *H02J 1/00* (2006.01)
  *B60L 11/14* (2006.01)
  *H01M 10/44* (2006.01)

(52) U.S. Cl.
  CPC ......... *B60L 11/185* (2013.01); *B60L 11/1846* (2013.01); *B60L 11/1861* (2013.01); *H01M 10/44* (2013.01); *H02J 7/0054* (2013.01); *B60L 2210/10* (2013.01); *B60L 2210/40* (2013.01); *B60L 2250/16* (2013.01); *H01M 2220/20* (2013.01); *Y02T 10/70* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/169* (2013.01); *Y04S 30/14* (2013.01)

(58) Field of Classification Search
  USPC .......................................... 320/103–105, 107
  See application file for complete search history.

(56) References Cited

U.S. PATENT DOCUMENTS

| | | | | |
|---|---|---|---|---|
| 4,871,957 A * | 10/1989 | Taranto | ................. | H02J 7/0034 320/105 |
| 5,936,381 A * | 8/1999 | Suh | ...................... | H02J 7/0047 320/104 |
| 6,262,492 B1 * | 7/2001 | Sheng | .................. | H02J 7/0034 307/10.1 |
| 7,573,236 B2 | 8/2009 | Sugimoto | ............. | H02J 7/0016 320/104 |
| 7,863,838 B2 * | 1/2011 | Aso | ..................... | B60L 11/1887 307/151 |
| 8,000,858 B2 | 8/2011 | Tonegawa et al. | | |
| 2006/0222910 A1 * | 10/2006 | Aoyagi | ............. | B60H 1/00392 429/432 |
| 2009/0078521 A1 | 3/2009 | Ohtomo | | |
| 2010/0106351 A1 * | 4/2010 | Hanssen | ................. | B60K 6/48 701/22 |
| 2010/0277845 A1 | 11/2010 | Park et al. | | |
| 2011/0115438 A1 | 5/2011 | Liu | | |
| 2011/0148353 A1 * | 6/2011 | King | ......................... | B60L 7/12 320/109 |
| 2011/0204849 A1 | 8/2011 | Mukai et al. | | |
| 2012/0286720 A1 * | 11/2012 | Fassnacht | ............. | B60L 3/0046 320/105 |

FOREIGN PATENT DOCUMENTS

| | | | | |
|---|---|---|---|---|
| JP | 10-112902 A | | 4/1998 | |
| JP | 2007-267561 A | | 10/2007 | |
| JP | 2009-73363 A | | 4/2009 | |
| JP | 2010-110050 A | | 5/2010 | |
| JP | 2010252520 A | * | 11/2010 | |
| JP | 2010-273427 A | | 12/2010 | |
| JP | 2010273427 A | * | 12/2010 | ............. B60L 1/006 |
| JP | 2011-188588 A | | 9/2011 | |
| JP | 2011188588 A | * | 9/2011 | |
| KR | 10-2011-0044550 A | | 4/2001 | |
| KR | 2003-0046074 A | | 6/2003 | |
| KR | 10-2009-0075910 A | | 7/2009 | |
| KR | 10-2011-0044550 A | | 4/2011 | |
| KR | 10-2012-0130432 A | | 12/2012 | |

OTHER PUBLICATIONS

Chinese Office Action for Appl. No. 201280004389.6 dated Jan. 14, 2016 (w/ English translation).
Extended European Search Report for Appl. No. 12834518.8 dated Feb. 12, 2016.
International Search Report issued in PCT/KR2012/007597, dated Mar. 25, 2013.
Written Opinion of the International Searching Authority issued PCT/KR2012/007597, dated Mar. 25, 2013.
Japanese Office Action dated Jun. 3, 2014, issued in Japanese Application No. 2013-548374, together with English translation thereof.
Korean Office Action dated Jul. 3, 2014, issued in Korean Application No. 10-2011-0096404, together with English translation thereof.
Chinese Office Action for Appl. No. 201280004389.6 dated Jul. 6, 2015 (w/ English translation).
Japan Office Action for Appl. No. 2013-548374 dated Oct. 7. 2014 (w/ English translation).
Chinese Office Action, dated Jul. 19, 2016, for Chinese Application No. 201280004389.6, along with an English translation.

* cited by examiner

BATTERY CHARGING SYSTEM AND CHARGING METHOD USING SAME

This application is a Continuation of PCT International Application No. PCT/KR2012/007597 filed on Sep. 21, 2012, which claims priority under 35 U.S.C. § 119(a) to Patent Application No. 10-2011-0096404 filed in the Republic of Korea on Sep. 23, 2011, all of which are hereby expressly incorporated by reference into the present application.

TECHNICAL FIELD

The present invention relates to a battery charging system and a battery charging method using the same, and more particularly, to a battery charging system capable of charging batteries between electric cars and a battery charging method using the same.

BACKGROUND ART

Due to an exhaustion of fossil fuel and an interest in environmental pollution, an electric car driven using electric energy has been actively researched. Currently, a hybrid car using both an internal combustion engine and an electric motor as driving sources is commercialized, and a pure electric car using only electric energy is researched and commercialized.

A battery of the electric car using electric energy may be completely discharged by negligence of a user while driving or an unexpected reason. Particularly, in the hybrid car and the pure electric car starting with the use of electric motor power, when a battery for storing electric energy is discharged, the car should be towed to a charging station or an area where a power supply is possible.

U.S. Pat. No. 8,000,858 published on Feb. 12, 2009 discloses an apparatus for charging an electric car.

However, after a battery is discharged, only a method can be used in which a tow truck must be used to move the electric car to a place where such a charging apparatus is installed.

DETAILED DESCRIPTION OF THE INVENTION

Technical Problem

An object of the present invention is to provide a battery charging system capable of transmitting electric energy between electric cars and a battery charging method using the same.

Technical Solution

A battery charging system according to the present invention to solve the above described problems includes a first connector connected to both ends of a battery of a charging providing car (e.g., charge providing car); a second connector connected to both ends of a battery of a charging target car; a converter connected between the first connector and the second connector and configured to convert a voltage transmitted from the battery of the charging providing car through the first connector and transmit the converted voltage to the battery of the charging target car through the second connector; and a controller configured to control an electrical connection of the first connector and the second connector and connected to each of a battery management system (BMS) of the charging providing car and a BMS of the charging target car to control a voltage conversion ratio of the converter based on a state information on each of the batteries transmitted from each of the BMSs.

Further, the first connector may include a first positive electrode relay configured to connect a positive electrode of the battery of the charging providing car and a positive electrode of an input terminal of the converter; a first negative electrode relay configured to connect a negative electrode of the battery of the charging providing car and a negative electrode of the input terminal of the converter; a first capacitive element connected to the input terminal of the converter in parallel; and a first precharge unit connected to the first positive electrode relay in parallel, wherein the first precharge unit comprises a first precharge relay and a first precharge resistor connected to the first precharge relay in series.

Further, the controller may perform an input side precharge of charging a predetermined voltage in the first capacitive element by opening the first positive electrode relay to disconnect a connection and closing the first negative electrode relay and the first precharge relay when the first connector is connected to the battery of the charging providing car, and perform power transmission to the converter from the battery of the charging providing car by closing the first positive electrode relay and opening the first precharge relay when the input side precharge is completed.

Further, the second connector may include a second positive electrode relay configured to connect a positive electrode of the battery of the charging target car and a positive electrode of an output terminal of the converter; a second negative electrode relay configured to connect a negative electrode of the battery of the charging target car and a negative electrode of the output terminal of the converter; a second capacitive element connected to the output terminal of the converter in parallel; and a second precharge unit connected to one of the second positive electrode relay and the second negative electrode relay in parallel, wherein the second precharge unit comprises a second precharge relay and a second precharge resistor connected to the second precharge relay in series.

Further, the controller may perform an output side precharge of charging a predetermined voltage in the second capacitive element by opening the second positive electrode relay to disconnect a connection and closing the second negative electrode relay and the second precharge relay when the second connector is connected to the battery of the charging target car, and perform power transmission to the battery of the charging target car from the converter by closing the second positive electrode relay and opening the second precharge relay when the output side precharge is completed.

Further, the state information on the battery of the charging providing car transmitted from the BMS of the charging providing car may contain at least one of energy transmittable from the BMS of the charging providing car, a maximum instantaneous output power allowance, an output voltage of the battery of the charging providing car, and a power quantity transmitted from the battery of the charging providing car.

Further, the state information on the battery of the charging target car transmitted from the BMS of the charging target car may contain at least one of energy receivable from the BMS of the charging target car, a maximum instantaneous input power allowance, an input voltage of the battery of the charging target car, and a power quantity transmitted to the battery of the charging target car.

Further, the battery charging system may further include a power meter connected to the converter and configured to measure a transmitted power quantity provided to the battery of the charging target car from the battery of the charging providing car.

The controller may receive the transmitted power quantity from the power meter and calculate a rate based on the transmitted power quantity.

The battery charging system may further include a display unit connected to the controller, wherein the display unit displays the transmitted power quantity and/or information on the rate.

Further, the converter may be a DC/DC converter configured to receive DC power and output the DC power.

A battery charging method according to the present invention to solve the above described problems includes receiving battery state information on a battery of a charging providing car and a battery of a charging target car from a BMS of the charging providing car and a BMS of the charging target car, respectively; performing an input side precharge by connecting a first precharge relay provided between the battery of the charging providing car and an input terminal of the converter with a first precharge resistor; performing an output side precharge by connecting a second precharge relay provided between the battery of the charging target car and an output terminal of the converter with a second precharge resistor; after the input side precharge ends, transmitting power to the input terminal of the converter from the battery of the charging providing car by disconnecting a connection of the first precharge relay and closing a first positive electrode relay configured to connect the battery of the charging providing car and the input terminal of the converter; after the output side precharge ends, transmitting power to the battery of the charging target car from the output terminal of the converter by disconnecting a connection of the second precharge relay and closing a second positive electrode relay configured to connect the battery of the charging target car and the output terminal of the converter; controlling a voltage conversion ratio of the converter based on the battery state information and charging the battery of the charging target car, by a controller.

Further, the battery state information received from the BMS of the charging providing car by the controller may contain information on at least one of energy transmittable from the BMS of the charging providing car, a maximum instantaneous output power allowance, an output voltage of the battery of the charging providing car, and a power quantity transmitted from the battery of the charging providing car.

Further, the battery state information received from the BMS of the charging target car by the controller may contain information on at least one of receivable energy, a maximum instantaneous input power allowance, an output voltage of the battery of the charging target car, and a power quantity transmitted to the battery of the charging target car.

Further, the battery charging method may further include measuring a transmitted power quantity provided to the battery of the charging target car through the converter.

Further, the battery charging method may further include calculating a power rate based on the transmitted power quantity.

Further, the battery charging method may further include displaying information on the transmitted power quantity and/or the power rate.

Further, the battery charging method may further include receiving the transmitted power quantity and/or the power rate before charging is initiated in order to select the transmitted power quantity and/or the power rate in advance.

Further, the battery charging method may further include disconnecting a connection of the first precharge relay, the second precharge relay, a first main relay and a second main relay when a charging for the battery of the charging target car is completed.

Further, the battery charging method may further include making a request for stopping power transmission/reception to the BMS of the charging providing car and the BMS of the charging target car when a charging of the battery of the charging target car is completed.

Further, the battery charging method may further include making a request for electrically separating the battery of the charging target car from the inverter and a request for electrically separating the battery of the charging providing car from the inverter.

Advantageous Effects

When a battery of an electric car is discharged or needs to be charged due to other reasons, a battery charging system and a battery charging method using the same according to the present invention can conveniently solve a battery charging problem with low costs since the electric car can receive energy from another neighboring electric car without being moved to a charging facility by a tow truck.

Further, since a DC/DC converter is used, there is an advantage in that a power transmission efficiency is higher in comparison with a conventional method of charging a battery by converting AC power to DC power.

BEST MODE

Hereinafter, exemplary embodiments of the present invention will be described in detail with reference to the accompanying drawings. However, the present exemplary embodiment is not limited to the following exemplary embodiment and may be implemented in various forms. The present exemplary embodiment is provided to make the disclosure of the present invention perfect and to make those skilled in the art perfectly comprehend the scope of the present invention. Shapes of components in the drawings may be exaggeratedly expressed for a clear description, and the same reference numerals in the drawings will be assigned to the same elements.

An electric car which will be described below refers to a vehicle using one or more electric motors for thrust. Energy used for moving the electric car includes an electrical source such as a rechargeable battery and/or a fuel cell. The electric car may be a hybrid electric vehicle using an internal combustion engine as another power source.

Figure 1:
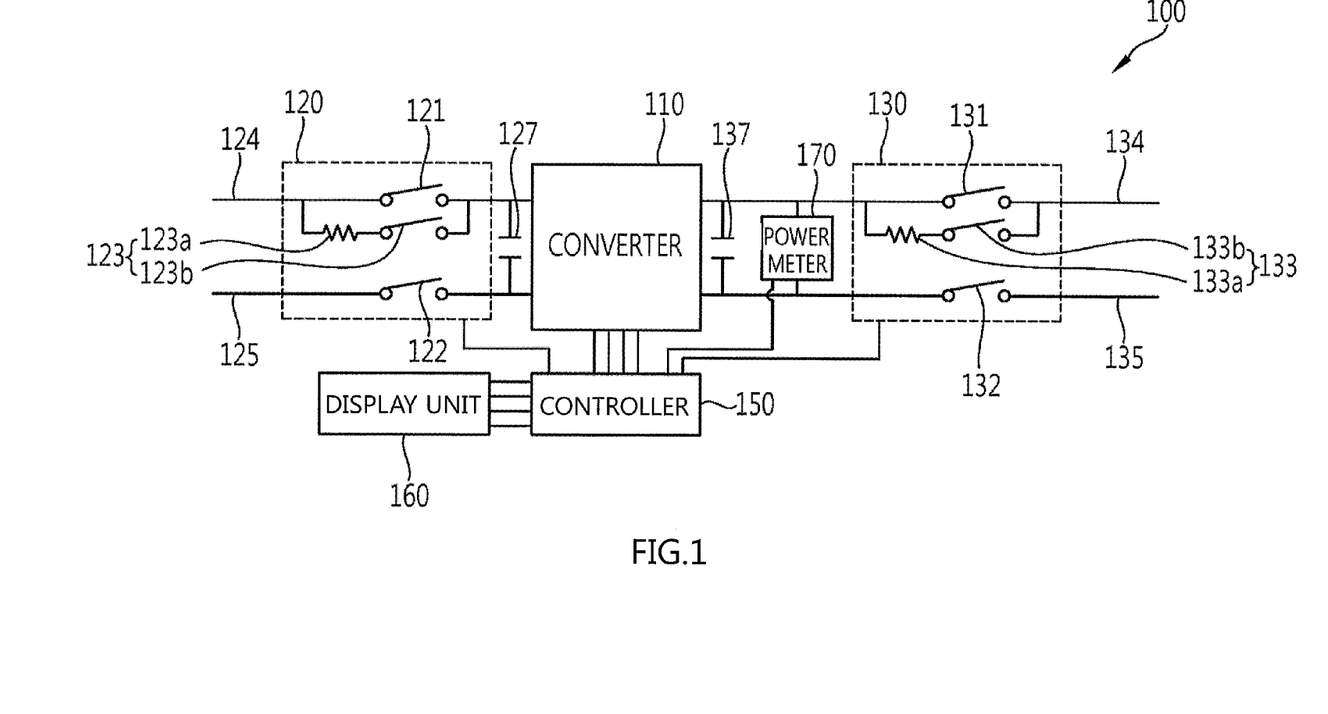
FIG. 1 is a block diagram illustrating a battery charging system according to an exemplary embodiment of the present invention.

FIG. 1 is a block diagram illustrating a battery charging system according to an exemplary embodiment of the present invention.

As illustrated in FIG. 1, a battery charging system according to an exemplary embodiment of the present invention includes a converter 110, a first connector 120, a second connector 130, a power meter 170, a controller 150, and a display unit 160.

The converter 110 converts a voltage level applied to an input terminal of the converter 110 and outputs the converted voltage level to an output terminal.

In general, a state of charging (SOC) of a battery (not shown) of a discharged electric car (hereinafter, referred to as a charging target car) is lower than an SOC of a battery (not shown) of an electric car (hereinafter, referred to as a charging providing car) providing charging energy. Accordingly, a voltage level of the battery of the charging target car is lower than a voltage level of the battery of the charging providing car.

Therefore, a converter for a voltage drop in which an output voltage is lower than an input voltage may be used as the converter 110.

Further, since the battery of the charging providing car may provide DC power and the battery of the charging target car may receive DC power, the converter 110 may be a DC/DC converter for receiving DC power and outputting the DC power.

The input terminal of the converter 110 includes the first connector 120.

The first connector 120 may include a first positive electrode relay 121 connected to a positive electrode line 124 of the input terminal of the converter 110 and configured to be turned on/off, a first negative electrode relay 122 connected to a negative electrode line 125 of the input terminal of the converter 110 and configured to be turned on/off, a first precharge unit 123 connected to the first positive electrode relay 121 in parallel, and a first capacitive element 127 connected between the positive electrode line 124 and the negative electrode line 125 and connected to the converter 110 in parallel.

Further, the first precharge unit 123 may include a first precharge relay 123b configured to be turned on/off and a first precharge resistor 123a connected to the first precharge relay 123b in series.

Here, "off" means disconnecting a corresponding connection, and "on" means the reverse thereof.

When the input terminal of the converter 110 is connected to the battery of the charging providing car, the first precharge unit 123 prevents a momentary over current due to a rapid voltage change.

That is, the first positive electrode relay 121 is turned off and the first precharge relay 123b is turned on, so that the voltage applied from the battery of the charging providing car is applied to the first capacitive element 127 through the first precharge resistor 123a and voltages of both ends of the first capacitive element 127 are charged to reach a predetermined value.

Thereafter, the momentary over current due to the rapid voltage change is prevented by turning off the first precharge relay 123b and turning on the first positive electrode relay 121 to directly connect the battery of the charging providing car and the converter 110.

The output terminal of the converter 110 includes the second connector 130.

The second connector 130 may be formed in a similar structure to that of the first connector 120.

That is, the second connector 130 may include a second positive electrode relay 131 connected to a positive electrode line 134 of the output terminal of the converter 110 and configured to be turned on/off, a second negative electrode relay 132 connected to a negative electrode line 135 of the output terminal of the converter 110 and configured to be turned on/off, a second precharge unit 133 connected to the second positive electrode relay 131 in parallel, and a second capacitive element 137 connected between the positive electrode line 134 and the negative electrode line 135 and connected to the converter 110 in parallel.

Further, the second precharge unit 133 may include a second precharge relay 133b configured to be turned on/off and a second precharge resistor 133a connected to the second precharge relay 133b in series.

When the output terminal of the converter 110 is connected to the battery of the charging target car, the second precharge unit 133 also prevents a momentary over current due to a rapid voltage change. Since the function is similar to that of the first precharge unit 123, its detailed description will be omitted.

The power meter 170 may be connected to the converter 110 in parallel to measure a transmitted power quantity provided to the battery of the charging target car from the converter 110.

The controller 150 may be connected to the converter 110 by a data bus to control an input and output voltage conversion ratio of the converter 110.

Further, the controller 150 may be connected to the first connector 120 and the second connector 130 to perform on/off controls of the first positive electrode relay 121, the first negative electrode relay 122, and the first precharge relay 123b of the first connector 120, and the second positive electrode relay 131, the second negative electrode relay 132, and the second precharge relay 133b of the second connector 130.

Moreover, the controller 150 may be connected to the power meter 170 to calculate power rates based on the transmitted power quantity measured by the power meter 170 and provide charge information.

Furthermore, the controller 150 may communicate with a BMS (not shown) of the battery of the charging target car and a BMS (not shown) of the battery of the charging providing car, perform a power transfer control, and compare a power quantity transmitted through the battery recognized by each BMS with the transmitted power quantity measured by the power meter 170.

The display unit 160 may display information, which is provided to a user during the charging, on a screen. For example, the display unit 160 may display information on a selection of a charging amount, an initiation of the charging, a progress of the charging, an end of the charging, a transmitted power quantity, a power rate and the like and receive information which can be selected by the user among the above listed information.

The display unit 160 may be connected to the controller 150 by a data bus to bidirectionally transfer information.

Figure 2:
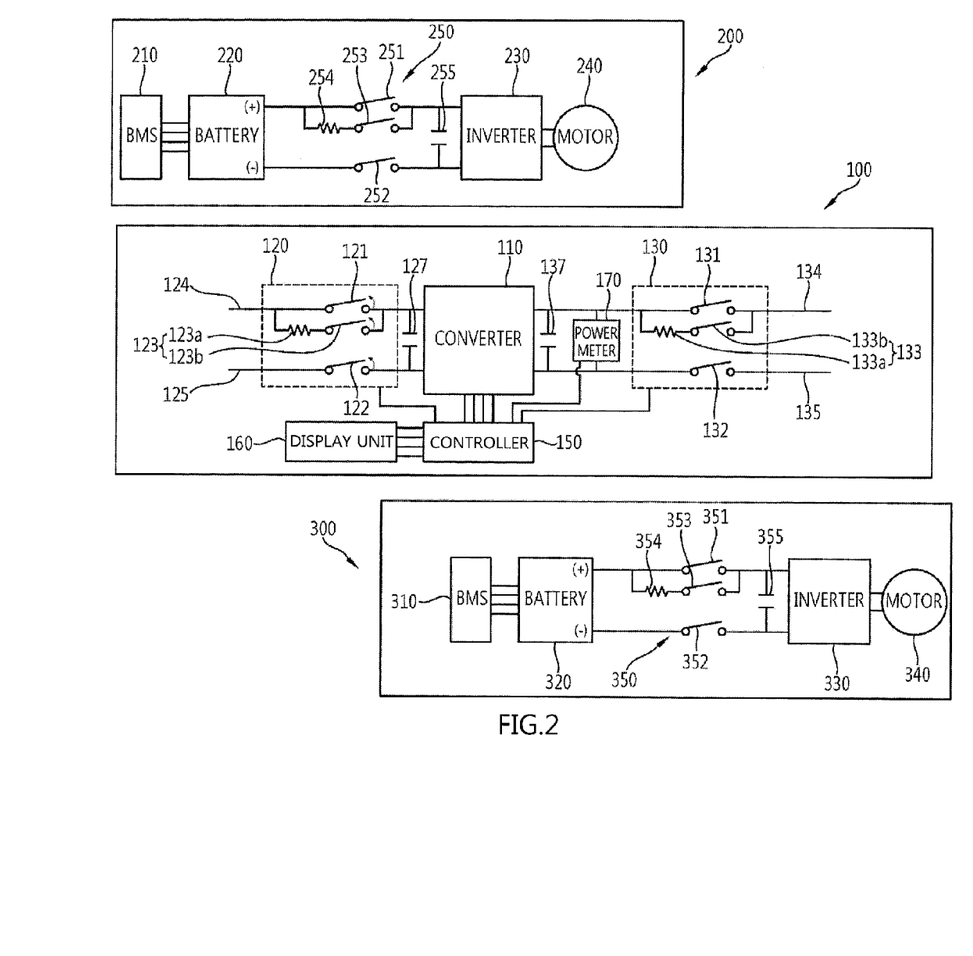
FIG. 2 is a block diagram illustrating a battery charging system, a charging providing car, and a charging target car according to an exemplary embodiment of the present invention.

FIG. 2 is a block diagram illustrating the battery charging system, a charging providing car, and a charging target car according to an exemplary embodiment of the present invention.

As illustrated in FIG. 2, the battery charging system 100 may transmit electric energy from a charging providing car 200 to a charging target car 300, between the charging providing car 200 and the charging target car 300.

The charging providing car 200 includes a battery management system (BMS) 210, a battery 220, an inverter 230, a motor 240, and a relay unit 250.

The battery 220 is an electricity storage source for storing electric energy which becomes power of the car. The BMS 210 may check various information on a state of the battery 220, for example, a maximum instantaneous input/output power allowance, an output voltage of the battery, an SOC and the like, control charging/discharging of the battery 220, and perform a control of the relay unit 250 connected to the battery 220.

The relay unit 250 may include a first main relay 251 connected to the positive electrode line of the battery 220 and configured to be turned on/off, a second main relay 252 connected to the negative electrode line and configured to be turned on/off, and an auxiliary relay 253 connected to the first main relay 251 in parallel.

The auxiliary relay 253 is a component for preventing an over current from flowing between the battery 220 and the inverter 230. When the over current is detected, the auxiliary relay 253 may restrain the current by using an auxiliary resistor 254 by turning off the first main relay 251 and turning on the auxiliary relay 253.

The inverter 230 is a component for converting DC power transmitted from the battery 220 to AC power and transmitting the converted AC power to the motor 240 or converting AC power transmitted from the motor 240 to DC power and then transmitting the converted DC power to the battery 220.

Further, the motor 240 is a component for generating driving power transmitted to the car.

Since a configuration of the charging target car 300 is similar to that of the charging providing car 200, its detailed description will be omitted.

Figure 3:
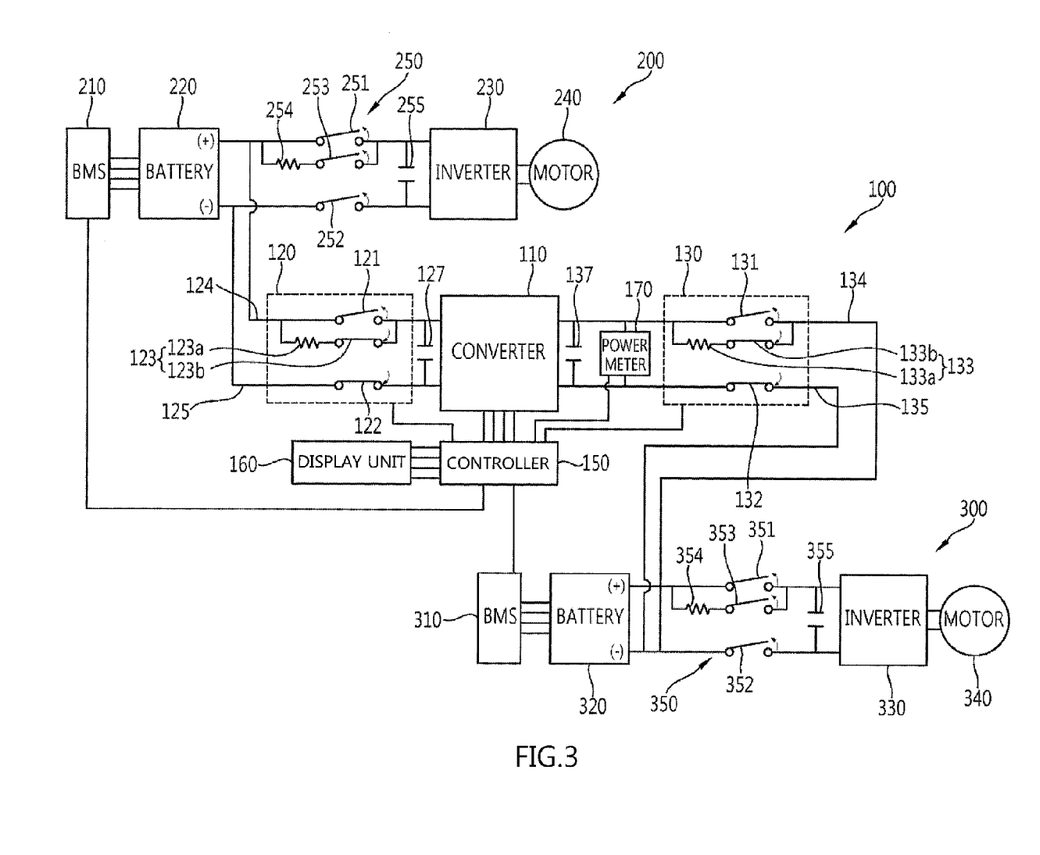
FIGS. 3 to 5 are block diagrams illustrating an operation process of a battery charging system according to an exemplary embodiment of the present invention.

FIG. 3 is a block diagram illustrating a precharge step of the battery charging system according to an exemplary embodiment of the present invention.

As illustrated in FIG. 3, in order to charge a battery 320 of the charging target car 300 by transmitting power to the charging target car 300 from the charging providing car 200, the controller 150, the BMS 210 of the charging providing car 200, and a BMS 310 of the charging target car 300 are first connected. The controller 150 and BMSs 210 and 310 of the respective cars 200 and 300 may communicate through a method such as a controller area network (CAN), FlexRay or the like.

The controller 150 may transmit power transmission mode information data to the BMSs 210 and 310 of the respective cars 200 and 300. As illustrated in FIG. 3, the BMS 210 or 310 of each car having received corresponding data separates the battery 220 or 320 from the inverter 230 or 330 by turning off all of the first main relay 251 or 351, the second main relay 252 or 352, and the auxiliary relay 253 or 353.

Further, the BMS 210 of the charging providing car 200 may be switched to a power transmission state, and the BMS 310 of the charging target car 300 may be switched to a power reception state.

When the off states of the relay units 250 and 350 are identified through the BMSs 210 and 310 of the respective cars 200 and 300 and the controller 150, the display unit 160 may display an information message for connecting the first connector 120 and the second connector 130 of the battery charging system 100. Alternatively, the first connector 120 and the second connector 130 may be in a connection state while all the relays 121, 122, 123b, 131, 132, and 133b are turned off.

The first connector 120 may be connected to both ends of the battery 220 of the charging providing car 200, and the second connector 130 may be connected to both ends of the battery 320 of the charging target car 300.

Meanwhile, selection of a charging initiation and the charging quantity/charging amount may be input into or a selectable interface may be displayed in the display unit 160. In this case, the charging quantity/charging amount displayed in the display unit 160 may be displayed within a range in which the charging providing car 200 can be driven, by considering the power quantity charged in the battery 220 of the charging providing car 200.

When the user selects the charging quantity or the charging amount and inputs a charging initiation signal, the controller 150 initiates the charging. At this time, the controller 150 may first identify the connection of the first connector 120 and the second connector 130 and then initiate the charging. When the connection of the first connector 120 and the second connector 130 is not recognized, the display unit 160 may display a message of identifying the connection of the first connector 120 and the second connector 130.

As illustrated in FIG. 3, when the charging is initiated, the controller 150 turns off the first positive electrode relay 121 and the second positive electrode relay 131 (or maintains the off state), and turns on the first precharge relay 123b, the second precharge relay 133b, the first negative electrode relay 122, and the second negative electrode relay 132.

Accordingly, prior to beginning the charging in earnest, in order to prevent the momentary over current due to the rapid voltage change generated by the connection between the battery charging system 100 and each battery 220 or 320 of each car 200 or 300, a precharge of charging in advance the first capacitive element 127 and the second capacitive element 137 is performed in the first connector 120 and the second connector 130, respectively.

The precharge may be performed until the first capacitive element 127 and the second capacitive element 137 are charged with a predetermined voltage value. Alternatively, the precharge may be performed until a charging time passes based on a time constant (T) by a capacitance value (C) of each capacitive element 127 or 137 and a resistance value (R) of each precharge resistor 123a or 133a.

Figure 4:
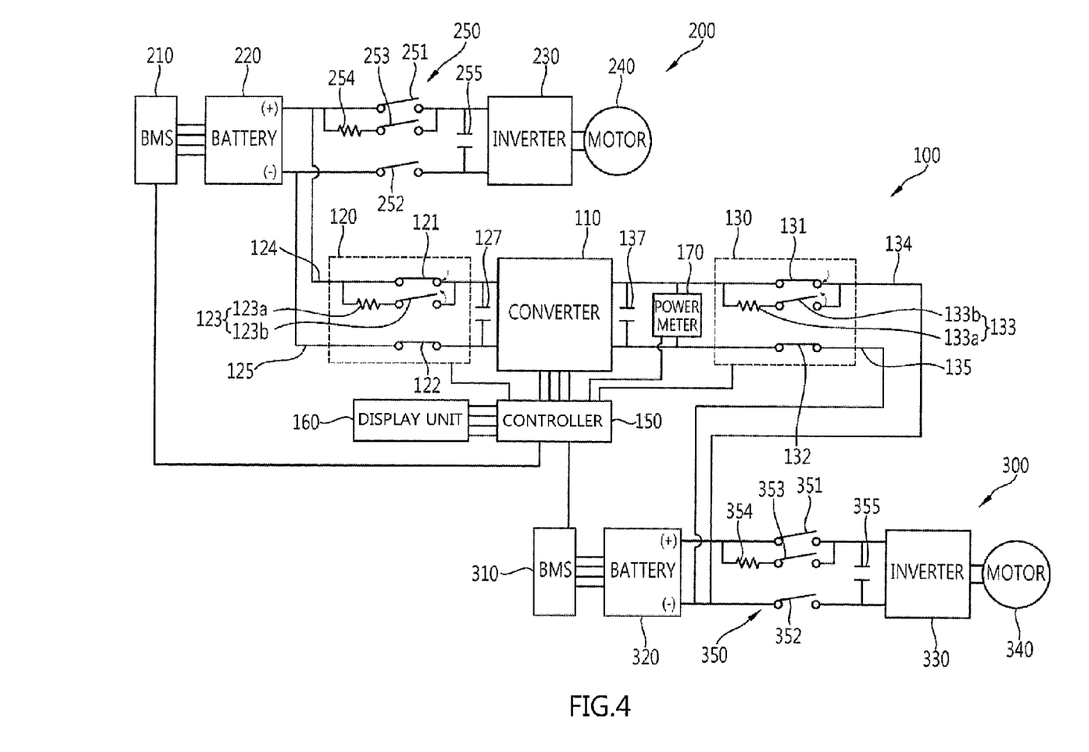

FIG. 4 is a block diagram illustrating a state where the charging is performed between the charging providing car and the charging target car by the battery charging system according to an exemplary embodiment of the present invention.

As illustrated in FIG. 4, after the precharge is completed, the controller 150 allows power to be transmitted to the input terminal of the converter 110 from the battery 220 of the charging providing car 200 by turning off the first precharge relay 123b and turning on the first positive electrode relay 121. The controller 150 allows the power to be transmitted to the battery 320 of the charging target car 300 from the output terminal of the converter 110 by turning off the second precharge relay 133b and turning on the second positive electrode relay 131 at the same time.

The controller 150 may receive information on a state of the battery of the charging providing car 200 such as energy transmittable from the BMS 210 of the charging providing car 200, a maximum instantaneous output allowance, an output voltage of the battery 220 and the like.

Further, the controller 150 may receive information on a state of the battery of the charging target car 300 such as energy receivable from the BMS 310 of the charging target car 300, a maximum instantaneous input allowance, an output voltage of the battery 320 and the like.

The controller 150 may control a voltage conversion ratio of the converter 110 based on the information on the state of the battery received from the BMS 210 or 310 of each car and allow power transmission to be achieved.

The voltage conversion ratio means a ratio of a voltage output to the output terminal to a voltage applied to the input terminal.

Further, the controller 150 may communicate with the BMS 210 or 310 of each car and control a power transmission state of each car 200 or 300 through each BMS 210 or 310. The power transmission state refers to an output voltage/current of the battery 220 or 320 of each car 200 or 300, a transmitted power quantity and the like.

In addition, the controller 150 may receive data on a transmitted power quantity measured by the power meter 170. The transmitted power quantity transmitted from the power meter 170 may be compared with the transmitted power quantity received from the BMS 210 or 310 of each car. Furthermore, the controller 150 may calculate a power rate through the transmitted power quantity.

Further, the controller 150 may allow the user to recognize a power transmission state by displaying information on the transmitted power quantity and the power rate in the display unit 160 in real time.

Figure 5:
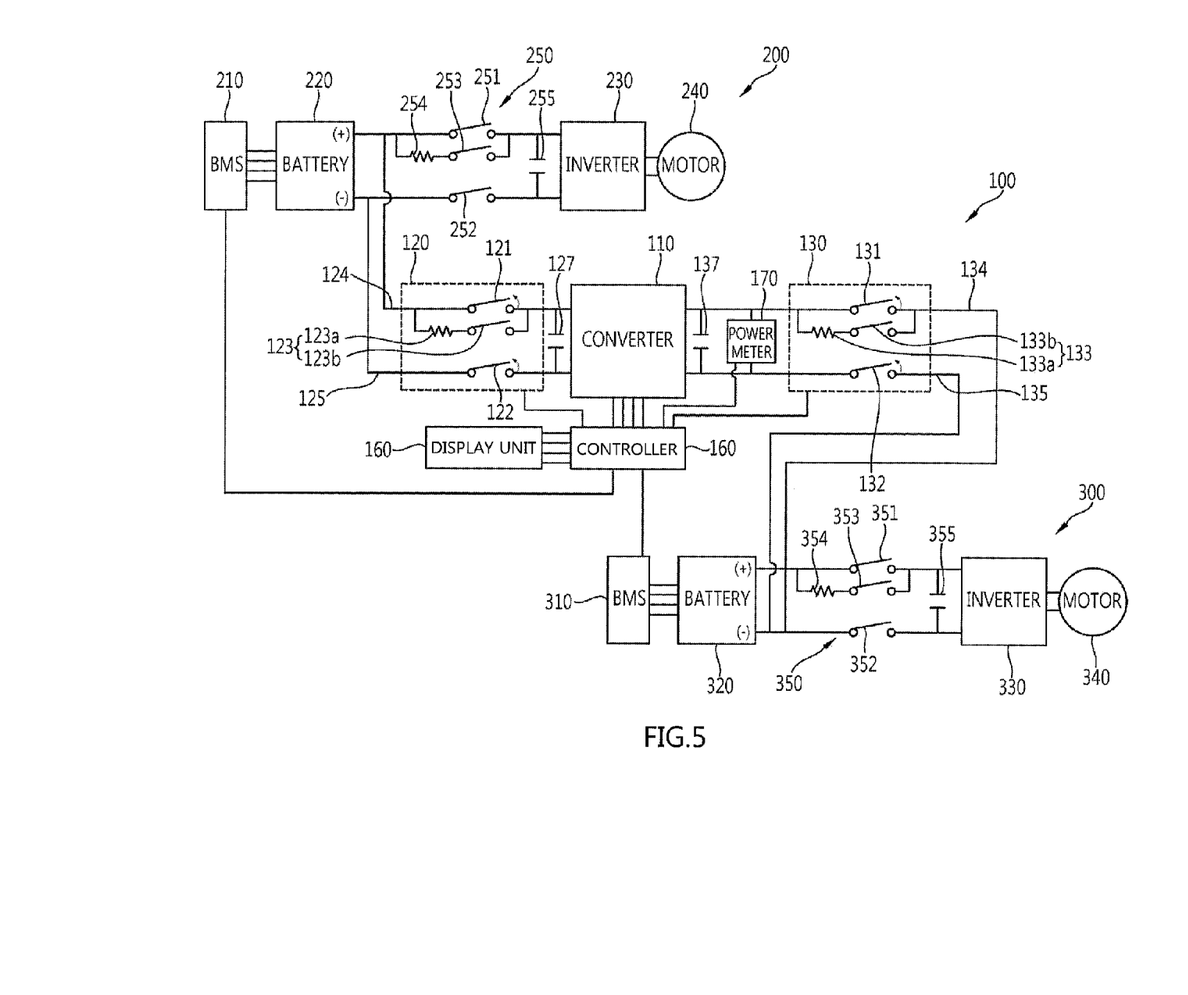

FIG. 5 is a block diagram illustrating a state where a battery charging is completed according to an exemplary embodiment of the present invention.

As illustrated in FIG. 5, when the battery 320 of the charging target car 300 is completely charged, the controller 150 disconnects a connection between the converter 110 and the battery 220 of the charging providing car 200 by turning off the first positive electrode relay 121 and the first negative electrode relay 122 and disconnects a connection between the converter 110 and the battery 320 of the charging target car 300 by turning off the second positive electrode relay 131 and the second negative electrode relay 132, so that power transmission through the battery charging system 100 may be blocked. Further, the controller 150 may make a request for stopping power transmission and power charging to the BMS 210 of the charging providing car 200 and the BMS 310 of the charging target car 300, respectively. Accordingly, the BMS 210 of the charging providing car 200 may stop outputting power from the battery 220, and the BMS 310 of the charging target car 300 may stop receiving power from the battery 320.

In addition, the controller 150 may transmit accumulated power quantities completely transmitted from the power meter 170 and/or the respective BMSs 210 and 310 of the charging providing car 200 and the charging target car 300 and data on a power rate calculated based on the accumulated power quantities to the display unit 160.

The display unit 160 may display the accumulated power quantities and the power rate received from the controller 150 to allow the user to identify them.

When the user selects a charging quantity or a charging amount when initially starting the charging, a time when the corresponding charging quantity or charging amount is reached may be considered as a charging completion time. Alternatively, the charging may be completed by a charging stop signal of the user.

Thereafter, the user may complete a charging operation by separating the first connector 120 from the battery 220 of the charging providing car 200, separating the second connector 130 from the battery 320 of the charging target car 300, and separating the controller 150 from the BMSs 210 and 310 of the respective cars 200 and 300.

When the charging is required since the battery of the electric car is discharged by the above configuration or due to another reason, the electric car may receive energy from another neighboring electric car without being moved to a charging facility by a tow truck, thereby conveniently solving a battery charging problem with low costs.

Further, since a DC/DC converter is used, a power transmission efficiency is higher in comparison with a conventional method of charging a battery by converting AC power to DC power.

Hereinafter, a battery charging method using a battery charging system according to an exemplary embodiment of the present invention will be described.

Figure 6:
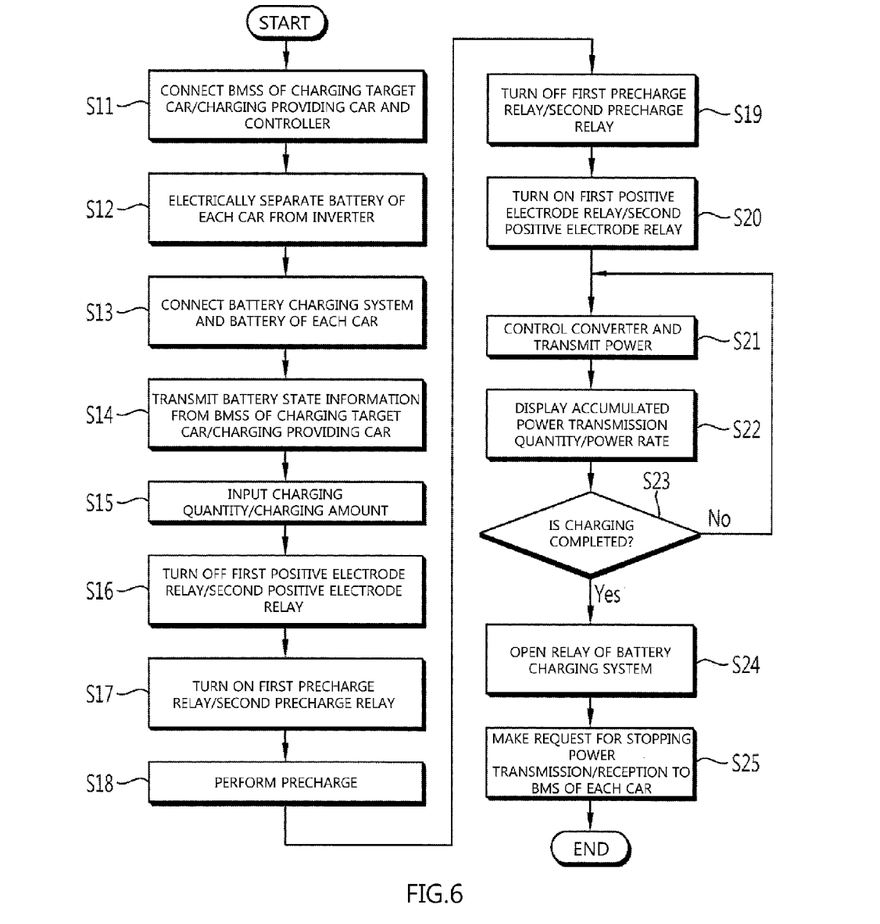
FIG. 6 is a flowchart illustrating a charging method using a battery charging system according to the present invention.

FIG. 6 is a flowchart illustrating a charging method using a battery charging system according to the present invention.

As illustrated in FIG. 6, in order to charge the battery 320 of the charging target car 300 by transmitting power to the charging target car 300 from the charging providing car 200, the controller 150 is first connected with the BMS 210 of the charging providing car 200 and the BMS 310 of the charging target car 300 (step S11). The connected controller 150 and BMSs 210 and 310 of the respective cars 200 and 300 may communicate with each other through a method such as a CAN and the like.

Thereafter, the controller 150 may transmit power transmission mode information data to the BMSs 210 and 310 of the respective cars 200 and 300.

The BMS 210 or 310 of each car 200 or 300 having received the corresponding data electrically separates the battery 220 or 320 from the inverter 230 or 330 by turning off all of the first main relay 251 or 351, the second main relay 252 or 352, and the auxiliary relay 253 or 353 (step S12).

Further, the battery charging system 100 is connected to the battery 220 of the charging providing car 200 and the battery 320 of the charging target car 300 (step S13).

Specifically, the first connector 120 may be connected to both ends of the battery 220 of the charging providing car 200, and the second connector 130 may be connected to both ends of the battery 320 of the charging target car 300.

The first connector 120 and the second connector 130 may be connected while all the relays 121, 122, 123b, 131, 132, and 133b are turned off. Alternatively, when the off states of the relay units 250 and 350 of the respective cars 200 and 300 are identified through the BMSs 210 and 310 of the respective cars 200 and 300 and the controller 150 and an information message for connecting the first connector 120 and the second connector 130 of the battery charging system 100 is displayed in the display unit 160, the first connector 120 and the second connector 130 may be connected to the battery 220 or 320 of each car 200 or 300.

The controller 150 may receive information on a state of the battery of the charging providing car 200 from the BMS 210 of the charging providing car 200 and information on a state of the battery of the charging target car 300 from the BMS 310 of the charging target car 300 at the same time (step S14).

At this time, the information on the state of the battery transmitted from the BMS 210 of the charging providing car 200 may be transmittable energy, a maximum instantaneous output allowance, an output voltage of the battery 220 and the like. Further, the information on the state of the battery transmitted from the BMS 310 of the charging target car 300 may be receivable energy, a maximum instantaneous input allowance, an output voltage of the battery 320 and the like.

The selection of a charging initiation and the charging quantity/charging amount may be input into or a selectable interface may be displayed in the display unit 160, and the user can input or select the charging quantity/charging amount by the corresponding interface (step S15).

In this case, the charging quantity/charging amount displayed in the display unit 160 may be displayed within a range in which the charging providing car 200 can be driven, by considering the power quantity charged in the battery 220 of the charging providing car 200.

When the user selects the charging quantity or the charging amount and inputs a charging initiation signal, the controller 150 initiates the charging. At this time, the controller 150 may first identify the connection of the first connector 120 and the second connector 130 and then initiate the charging. When the connection of the first connector 120 and the second connector 130 is not recognized, the display unit 160 may display a message of the connection of the first connector 120 and the second connector 130.

When the charging is initiated, the controller 150 turns off the first positive electrode relay 121 and the second positive electrode relay 131 (or maintains the off state) (step S16), and turns on the first precharge relay 123*b*, the second precharge relay 133*b*, the first negative electrode relay 122, and the second negative electrode relay 132 (step S17).

Accordingly, prior to beginning the charging in earnest, a precharge of charging in advance the first capacitive element 127 and the second capacitive element 137 is performed (step S18).

The precharge is to prevent a momentary over current due to a rapid voltage change generated when the battery charging system 100 is connected to the batteries 220 and 320 of the respective cars 200 and 300.

The precharge may be performed until the first capacitive element 127 and the second capacitive element 137 are charged with a predetermined voltage value. Alternatively, the precharge may be performed until a charging time passes based on a time constant (T) by a capacitance value (C) of each capacitive element 127 or 137 and a resistance value (R) of each precharge resistor 123*a* or 133*a*.

After the precharge is completed, the controller 150 controls such that the first precharge relay 123*b* and the second precharge relay 133*b* are turned off (step S19), and controls such that the first positive electrode relay 121 and the second positive electrode relay 131 are turned on (step S20).

Further, the controller 150 may control a voltage conversion ratio of the converter 110 based on the information on the state of the battery received from the BMS 210 or 310 of each car 200 or 300, and allow power to be transmitted to the battery 320 of the charging target car 300 from the battery 220 of the charging providing car 200 through a medium of the battery charging system 100 (step S21).

In a process of performing the charging, the controller 150 may receive data on the measured transmitted power quantity from the power meter 170. The transmitted power quantity transmitted from the power meter 170 may be compared with the transmitted power quantity received from the BMSs 210 and 310 of the respective cars 200 and 300. Further, the controller 150 may calculate a power rate through the transmitted power quantities.

In addition, an accumulated transmitted power quantity and data on a power rate therefor are transmitted to the display unit 160 from the controller 150, and the display unit 160 allows the user to recognize a power transmission state by displaying information on the accumulated transmitted power quantity and the power rate in real time (step S22).

The controller 150 may determine whether the charging is completed by comparing the accumulated transmitted power quantity and the power rate therefor with the charging quantity/charging amount input or selected by the user when the charging is initiated (step S23).

That is, when the accumulated transmitted power quantity and the power rate therefor are lower than the charging quantity/charging amount input by the user, the power transmission is continued. When both values are equal, it may be determined that the charging is completed.

In this case, the charging may be completed by a charging stop signal of the user.

When the controller 150 determines that the charging is completed, the controller 150 disconnects a connection between the converter 110 and the battery 220 of the charging providing car 200 by turning off the first positive electrode relay 121 and the first negative electrode relay 122 and disconnects a connection between the converter 110 and the battery 320 of the charging target car 300 by turning off the second positive electrode relay 131 and the second negative electrode relay 132, so that power transmission through the battery charging system 100 may be blocked (step S24).

Further, the controller 150 may make a request for stopping the power transmission and the power charging to the BMS 210 of the charging providing car 200 and the BMS 310 of the charging target car 300, respectively (step S25). Accordingly, the BMS 210 of the charging providing car 200 may stop outputting power from the battery 220, and the BMS 310 of the charging target car 300 may stop receiving power from the battery 320.

Thereafter, the user may complete a charging operation by separating the first connector 120 from the battery 220 of the charging providing car 200, separating the second connector 130 from the battery 320 of the charging target car 300, and separating the controller 150 from the BMSs 210 and 310 of the respective cars 200 and 300.

The above-described exemplary embodiment of the present invention illustrated in the drawings should not be construed to limit the technical idea of the present invention. The scope of the present invention is limited only by the appended claims and those skilled in the art can improve and modify the technical idea of the present invention in various forms. Therefore, such an improvement and modification will be included in the scope of the present invention as long as the improvement and the modification are apparent to those skilled in the art.

The invention claimed is:

1. A battery charging system comprising:
   a first connector connected to both ends of a battery of a charge providing car;
   a second connector connected to both ends of a battery of a charging target car;
   a converter connected between the first connector and the second connector and configured to convert a voltage transmitted from the battery of the charge providing car through the first connector and transmit the converted voltage to the battery of the charging target car through the second connector;
   a controller configured to control an electrical connection of the first connector and the second connector and connected to each of a battery management system (BMS) of the charge providing car and a BMS of the charging target car to control a voltage conversion ratio of the converter based on battery state information on the batteries transmitted from the BMSs of the charge providing car and the charging target car, respectively, wherein the first connector comprises:
  a first positive electrode relay configured to connect all of:
    a positive electrode of the battery of the charge providing car,
    a positive electrode of a relay unit of the charge providing car connected between the positive electrode of the battery of the charge providing car and a positive electrode of a motor of the charge providing car, wherein the positive electrode of the battery of the charge providing car is indirectly connected to the positive electrode of the motor of the charge providing car via a positive electrode of a direct current-alternating current (DC-AC) inverter of the charge providing car, and
    a positive electrode of an input terminal of the converter;
  a first negative electrode relay configured to connect all of:
    a negative electrode of the battery of the charge providing car,
    a negative electrode of a relay unit of the charge providing car connected between the negative electrode of the battery of the charge providing car and a negative electrode of the motor of the charge providing car, wherein the negative electrode of the battery of the charge providing car is indirectly connected to the negative electrode of the motor of the charge providing car via a negative electrode of the DC-AC inverter of the charge providing car, and
    a negative electrode of the input terminal of the converter; and
  a first precharge unit connected to the first positive electrode relay in parallel, the first precharge unit including a first precharge relay and a first precharge resistor connected to the first precharge relay in series;
a first capacitive element connected to the input terminal of the converter in parallel, and connected between the converter and the first connector that includes the first positive and first negative electrode relays, both of the first connector and the first capacitive element being connected in parallel with both of the battery and the motor of the charge providing car,
wherein the second connector comprises:
  a second positive electrode relay configured to connect all of:
    a positive electrode of the battery of the charging target car,
    a positive electrode of a relay unit of the charging target car connected between the positive electrode of the battery of the charging target car and a positive electrode of a motor of the charging target car, wherein the positive electrode of the battery of the charging target car is indirectly connected to the positive electrode of the motor of the charging target car via a positive electrode of a DC-AC inverter of the charging target car, and
    a positive electrode of an output terminal of the converter;
  a second negative electrode relay configured to connect all of:
    a negative electrode of the battery of the charging target car,
    a negative electrode of a relay unit of the charging target car connected between the negative electrode of the battery of the charging target car and a negative electrode of the motor of the charging target car, wherein the negative electrode of the battery of the charging target car is indirectly connected to the negative electrode of the motor of the charging target car via a negative electrode of the DC-AC inverter of the charging target car, and
    a negative electrode of the output terminal of the converter; and
  a second precharge unit connected to the second positive electrode relay in parallel, the second precharge unit including a second precharge relay and a second precharge resistor connected to the second precharge relay in series;
a second capacitive element connected to the output terminal of the converter in parallel, and connected between the converter and the second connector that includes the second positive and second negative electrode relays, both of the second connector and the second capacitive element being connected in parallel with both of the battery and the motor of the charging target car; and
a display unit connected to the controller and configured to:
  display a transmitted power quantity provided to the battery of the charging target car from the battery of the charge providing car, and
  display, in real time, a power rate calculated based on the transmitted power quantity,
wherein the first connector, the second connector, the converter, the controller, the first precharge unit, the first capacitive element, the second precharge unit, the second capacitive element, and the display unit are all included in the battery charging system, which is a single system connected to, and separate from, the charge providing car and charging target car.

2. The battery charging system according to claim 1, wherein the controller performs an input side precharge of charging a predetermined voltage in the first capacitive element by opening the first positive electrode relay to disconnect a connection and closing the first negative electrode relay and the first precharge relay when the first connector is connected to the battery of the charge providing car, and performs power transmission to the converter from the battery of the charge providing car by closing the first positive electrode relay and opening the first precharge relay when the input side precharge is completed.

3. The battery charging system according to claim 1, wherein the controller performs an output side precharge of charging a predetermined voltage in the second capacitive element by opening the second positive electrode relay to disconnect a connection and closing the second negative electrode relay and the second precharge relay when the second connector is connected to the battery of the charging target car, and performs power transmission to the battery of the charging target car from the converter by closing the second positive electrode relay and opening the second precharge relay when the output side precharge is completed.

4. The battery charging system according to claim 1, wherein the state information on the battery of the charge providing car transmitted from the BMS of the charge providing car contains at least one of energy transmittable from the BMS of the charge providing car, a maximum instantaneous output power allowance, an output voltage of the battery of the charge providing car, and a power quantity transmitted from the battery of the charge providing car.

5. The battery charging system according to claim 1, wherein the state information on the battery of the charging target car transmitted from the BMS of the charging target car contains at least one of energy receivable from the BMS of the charging target car, a maximum instantaneous input power allowance, an input voltage of the battery of the charging target car, and a power quantity transmitted to the battery of the charging target car.

6. The battery charging system according to claim 1, further comprising:
a power meter connected to the converter and configured to measure a transmitted power quantity provided to the battery of the charging target car from the battery of the charging providing car.

7. The battery charging system according to claim 6, wherein the controller receives the transmitted power quantity from the power meter and calculates a rate based on the transmitted power quantity.

8. The battery charging system according to claim 7, further comprising:
a display unit connected to the controller,
wherein the display unit displays the transmitted power quantity and/or information on the rate.

9. A battery charging method comprising:
providing, in a first connector, a first positive electrode relay configured to connect all of:
a positive electrode of a battery of a providing car,
a positive electrode of a relay unit of the charge providing car connected between the positive electrode of the battery of the charge providing car and a positive electrode of a motor of the charge providing car, wherein the positive electrode of the battery of the charge providing car is indirectly connected to the positive electrode of the motor of the charge providing car via a positive electrode of a direct current-alternating current (DC-AC) inverter of the charge providing car, and
a positive electrode of an input terminal of a converter;
providing, in the first connector, a first negative electrode relay configured to connect all of:
a negative electrode of the battery of the providing car,
a negative electrode of a relay unit of the charge providing car connected between the negative electrode of the battery of the charge providing car and a negative electrode of the motor of the charge providing car, wherein the negative electrode of the battery of the charge providing car is indirectly connected to the negative electrode of the motor of the charge providing car via a negative electrode of the DC-AC inverter of the charge providing car, and
a negative electrode of the input terminal of a converter;
providing, in the first connector, a first precharge unit including a first precharge relay and a first precharge resistor, the first precharge unit connected to the first positive electrode relay in parallel, the first precharge resistor connected to the first precharge relay in series;
providing a first capacitive element connected to the input terminal of the converter in parallel, and connected between the converter and the first connector that includes the first positive and first negative electrode relays, both of the first connector and the first capacitive element being connected in parallel with both of the battery and the motor of the charge providing car;

providing, in a second connector, a second positive electrode relay configured to connect all of:
a positive electrode of a battery of a charging target car,
a positive electrode of a relay unit of the charging target car connected between the positive electrode of the battery of the charging target car and a positive electrode of a motor of the charging target car, wherein the positive electrode of the battery of the charging target car is indirectly connected to the positive electrode of the motor of the charging target car via a positive electrode of a DC-AC inverter of the charging target car, and
a positive electrode of an output terminal of the converter;
providing, in the second connector, a second negative electrode relay configured to connect all of:
a negative electrode of the battery of the charging target car,
a negative electrode of a relay unit of the charging target car connected between the negative electrode of the battery of the charging target car and a negative electrode of the motor of the charging target car, wherein the negative electrode of the battery of the charging target car is indirectly connected to the negative electrode of the motor of the charging target car via a negative electrode of the DC-AC inverter of the charging target car, and
a negative electrode of the output terminal of the converter;
providing, in the second connector, a second precharge unit including a second precharge relay and a second precharge resistor, the second precharge unit connected to the second positive electrode relay in parallel, the second precharge resistor connected to the second precharge relay in series in the battery charging system;
providing a second capacitive element connected to the output terminal of the converter in parallel, and connected between the converter and the second connector that includes the second positive and second negative electrode relays, both of the second connector and the second capacitive element being connected in parallel with both of the battery and the motor of the charging target car; and
providing a display unit connected to a controller and configured to:
display a transmitted power quantity provided to the battery of the charging target car from the battery of the charge providing car, and
display, in real time, a power rate calculated based on the transmitted power quantity,
receiving battery state information on the battery of the charge providing car and the battery the charging target car from a battery management system (BMS) of the charge providing car and a BMS of the charging target car, respectively;
performing an input side precharge by connecting the first precharge relay with the first precharge resistor;
performing an output side precharge by connecting the second precharge relay with the second precharge resistor;
after the input side precharge ends, transmitting power to the input terminal of the converter from the battery of the charge providing car by disconnecting a connection of the first precharge relay and closing the first positive electrode relay;
after the output side precharge ends, transmitting power to the battery of the charging target car from the output terminal of the converter by disconnecting a connection of the second precharge relay and closing the second positive electrode relay; and controlling a voltage conversion ratio of the converter based on the battery state information on the batteries transmitted from the BMSs of the charge providing car and the charging target car, respectively, and charging the battery of the charging target car, by the controller, wherein the first connector, the second connector, the converter, the controller, the first precharge unit, the first capacitive element, the second precharge unit, the second capacitive element, and the display unit are all included in the battery charging system, which is a single system connected to, and separate from, the charge providing car and charging target car.

10. The battery charging method according to claim 9, wherein the battery state information received from the BMS of the charge providing car by the controller contains information on at least one of energy transmittable from the BMS of the charge providing car, a maximum instantaneous output power allowance, an output voltage of the battery of the charge providing car, and a power quantity transmitted from the battery of the charge providing car.

11. The battery charging method according to claim 9, wherein the battery state information received from the BMS of the charging target car by the controller contains information on at least one of receivable energy, a maximum instantaneous input power allowance, an input voltage of the battery of the charging target car, and a power quantity transmitted to the battery of the charging target car.

12. The battery charging method according to claim 9, further comprising:
measuring a transmitted power quantity provided to the battery of the charging target car through the converter.

13. The battery charging method according to claim 12, further comprising:
calculating a power rate based on the transmitted power quantity.

14. The battery charging method according to claim 13, further comprising:
displaying information on the transmitted power quantity and/or the power rate.

15. The battery charging method according to claim 14, further comprising:
receiving the transmitted power quantity and/or the power rate before charging is initiated in order to select the transmitted power quantity and/or the power rate in advance.

16. The battery charging method according to claim 9, further comprising:
disconnecting a connection of the first positive electrode relay, the first negative electrode relay, the second positive electrode relay and the second negative electrode relay when a charging for the battery of the charging target car is completed.

17. The battery charging method according to claim 9, further comprising:

making a request for stopping power transmission/reception to the BMS of the charge providing car and the BMS of the charging target car when a charging for the battery of the charging target car is completed.

18. The battery charging method according to claim 9, further comprising:
making a request for electrically separating the battery of the charging target car from the inverter and a request for electrically separating the battery of the charge providing car from the inverter.

19. The battery charging system according to claim 1, wherein the state information on the battery of the charge providing car transmitted from the BMS of the charge providing car includes each of energy transmittable from the BMS of the charge providing car, a maximum instantaneous output power allowance, an output voltage of the battery of the charge providing car, and a power quantity transmitted from the battery of the charge providing car, and wherein the state information on the battery of the charging target car transmitted from the BMS of the charging target car includes each of energy receivable from the BMS of the charging target car, a maximum instantaneous input power allowance, an input voltage of the battery of the charging target car, and a power quantity transmitted to the battery of the charging target car.

20. The battery charging system according to claim 1, further comprising:
a display unit connected to the controller; and
a power meter connected to the converter and configured to measure a transmitted power quantity provided to the battery of the charging target car from the battery of the charge providing car, wherein the controller is further configured to receive the transmitted power quantity from the power meter, and calculate a power rate based on the transmitted power quantity, wherein the display unit is configured to display the transmitted power quantity and the calculated power rate in real time, and wherein the controller is further configured to:
compare a power quantity and charging amount selected by a user to the transmitted power quantity and calculated power rate when charging of the battery of the charging target car is initiated and determine whether the charging is completed based on the compared power quantity and selected charging amount, continue, when the transmitted power quantity and calculated power rate are lower than the power quantity and charging amount selected by the user, the charging of the battery of the charging target car, and stop, when the transmitted power quantity and calculated power rate are equal to the power quantity and charging amount selected by the user, the charging of the battery of the charging target car.

* * * * *